United States Patent
Ursenbach

(10) Patent No.: US 12,370,757 B2
(45) Date of Patent: Jul. 29, 2025

(54) MANUFACTURING THERMOPLASTIC CONTAINER WITH INTERNAL BAFFLE(S)

(71) Applicant: Rohr, Inc., Chula Vista, CA (US)

(72) Inventor: Daniel O. Ursenbach, El Cajon, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/649,377

(22) Filed: Apr. 29, 2024

(65) Prior Publication Data

US 2024/0286364 A1 Aug. 29, 2024

Related U.S. Application Data

(63) Continuation of application No. 17/962,175, filed on Oct. 7, 2022, now Pat. No. 11,969,958.

(51) Int. Cl.
| | |
|---|---|
| *B29C 70/38* | (2006.01) |
| *B29C 33/52* | (2006.01) |
| *B29C 64/165* | (2017.01) |
| *B29C 64/188* | (2017.01) |
| *B29C 64/268* | (2017.01) |
| *B29C 64/295* | (2017.01) |
| *B29C 64/30* | (2017.01) |
| *B29C 64/40* | (2017.01) |
| *B29C 70/68* | (2006.01) |
| *B29L 31/00* | (2006.01) |

(Continued)

(52) U.S. Cl.
CPC ........... *B29C 70/386* (2013.01); *B29C 33/52* (2013.01); *B29C 64/165* (2017.08); *B29C 64/188* (2017.08); *B29C 64/268* (2017.08); *B29C 64/295* (2017.08); *B29C 64/30* (2017.08); *B29C 64/40* (2017.08); *B29C 70/682* (2013.01); *B29C 70/683* (2013.01); *B29L 2031/7172* (2013.01); *B33Y 10/00* (2014.12); *B33Y 30/00* (2014.12); *B33Y 80/00* (2014.12)

(58) Field of Classification Search
CPC .......... B29C 70/386; B29C 70/32–347; B29C 70/38–388; B29C 33/485; B29C 33/505; B29C 33/52; B29L 2031/7172
See application file for complete search history.

(56) References Cited

U.S. PATENT DOCUMENTS

| | | | | |
|---|---|---|---|---|
| 6,095,367 | A | * 8/2000 | Blair | ................ B60K 15/03006 220/586 |
| 10,816,138 | B2 | 10/2020 | Zhao | |

(Continued)

FOREIGN PATENT DOCUMENTS

| | | |
|---|---|---|
| EP | 3450321 B1 | 7/2020 |
| WO | 9623721 W | 8/1996 |

*Primary Examiner* — Atul P. Khare
(74) *Attorney, Agent, or Firm* — Getz Balich LLC

(57) ABSTRACT

A method is provided for manufacturing a container. During this method, a baffle is provided. The baffle is configured from or otherwise includes baffle thermoplastic material. A sidewall is formed using an additive manufacturing device. The sidewall is bonded to the baffle during the forming of the sidewall. The sidewall circumscribes the baffle. The sidewall is configured from or otherwise includes sidewall thermoplastic material. The container includes an internal chamber, the baffle and the sidewall. The sidewall forms an outer peripheral boundary of the internal chamber. The baffle is arranged within the internal chamber.

20 Claims, 10 Drawing Sheets

(51) Int. Cl.
*B33Y 10/00* (2015.01)
*B33Y 30/00* (2015.01)
*B33Y 80/00* (2015.01)

(56) References Cited

U.S. PATENT DOCUMENTS

| | | |
|---|---|---|
| 2019/0061276 A1* | 2/2019 | Gurney .................. B32B 15/08 |
| 2019/0061986 A1 | 2/2019 | Slane |
| 2019/0170297 A1 | 6/2019 | Criel |
| 2020/0384719 A1 | 12/2020 | Benson |
| 2021/0002060 A1 | 1/2021 | Wendt |
| 2021/0245447 A1 | 8/2021 | Takami |

* cited by examiner

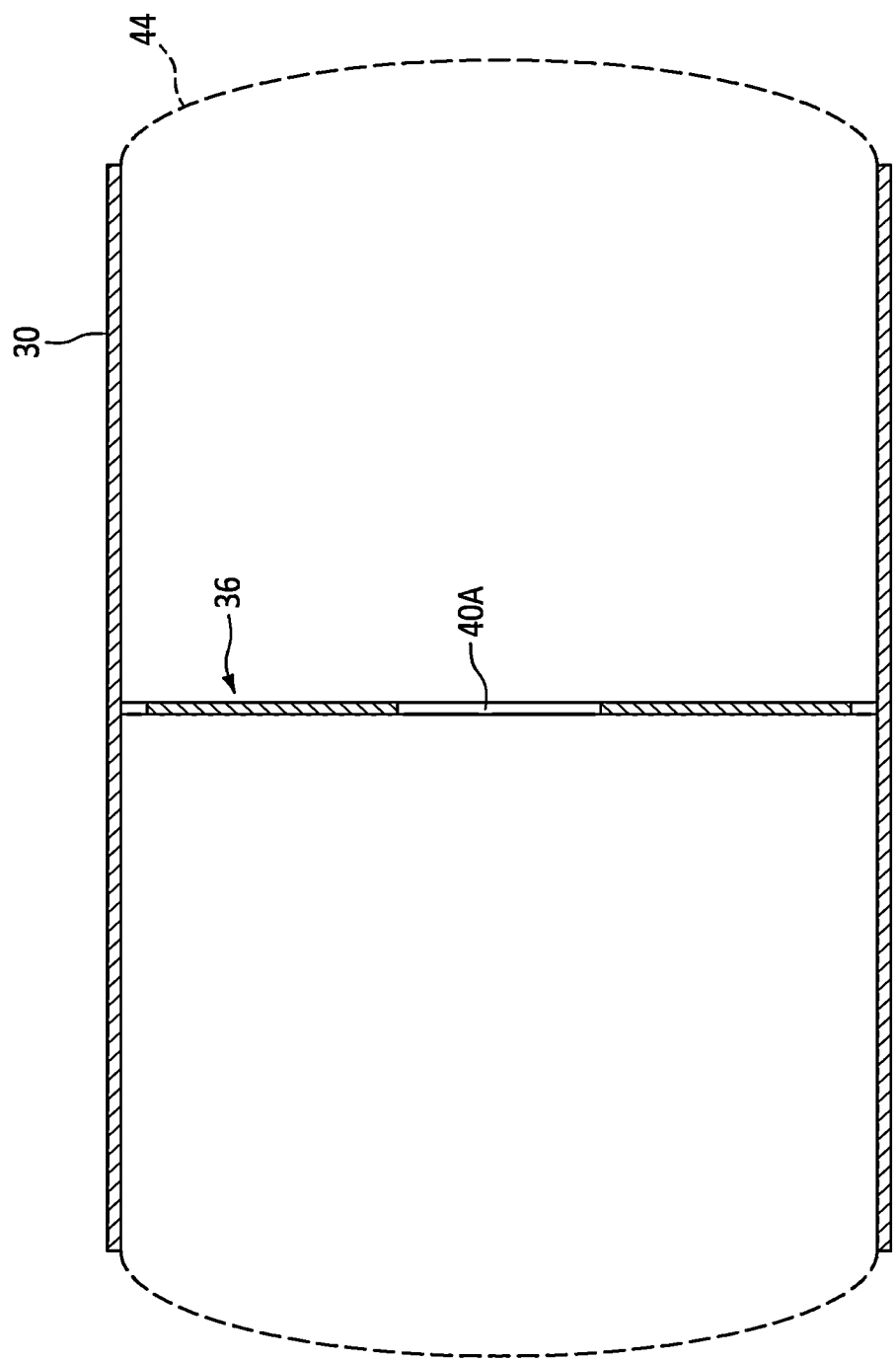

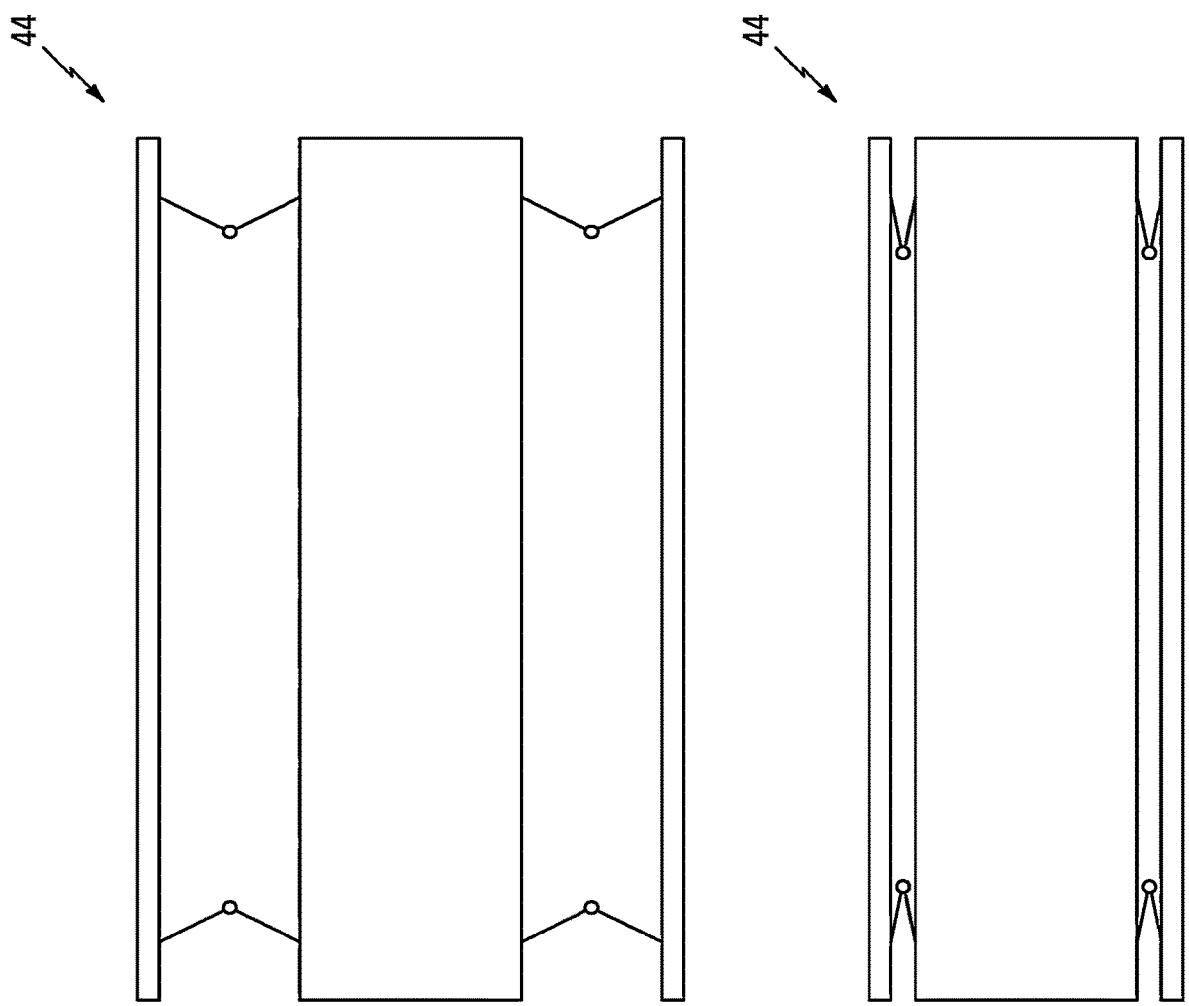

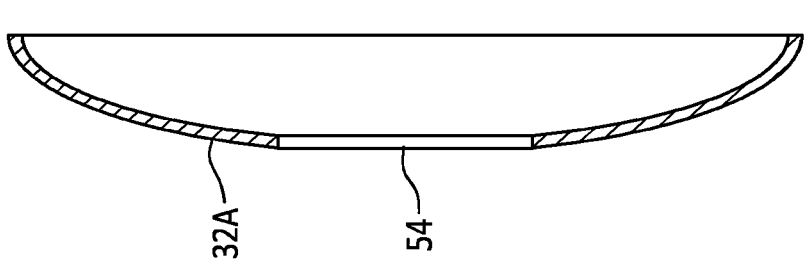
FIG. 10
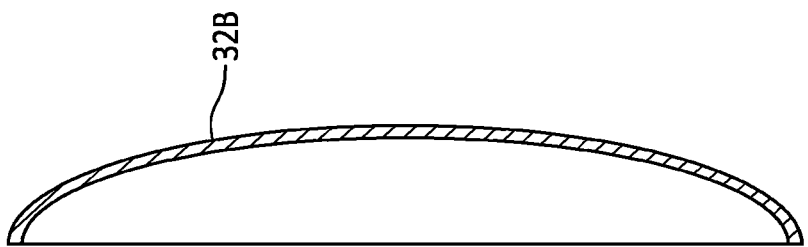
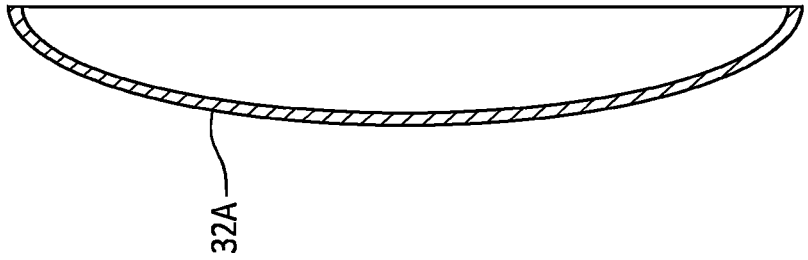
FIG. 9

MANUFACTURING THERMOPLASTIC CONTAINER WITH INTERNAL BAFFLE(S)

CROSS-REFERENCE TO RELATED APPLICATIONS

This application claims priority to and is a continuation of U.S. patent application Ser. No. 17/962,175 filed Oct. 7, 2022, which is hereby incorporated herein by reference in its entirety.

BACKGROUND

1. Technical Field

This disclosure relates generally to thermoplastics and, more particularly, to manufacturing a thermoplastic container.

2. Background Information

An apparatus such as an aircraft may include a thermoplastic container to hold a fluid. Various types and configurations of thermoplastic containers are known in the art. Furthermore, various methods for manufacturing thermoplastic containers are known in the art. More generally, various methods are also known in the art for manufacturing thermoplastic articles including using a laser assisted, in-situ fiber placement device to form a thermoplastic skin over a structural thermoplastic frame. While these known manufacturing methods have various advantages, there is still room in the art for improvement. There is a need in the art, in particular, for methods which can further automate and/or simplify manufacture of a thermoplastic container.

SUMMARY OF THE DISCLOSURE

According to an aspect of the present disclosure, a method is provided for manufacturing a container. During this method, a baffle is provided. The baffle is configured from or otherwise includes baffle thermoplastic material. A sidewall is formed using an additive manufacturing device. The sidewall is bonded to the baffle during the forming of the sidewall. The sidewall circumscribes the baffle. The sidewall is configured from or otherwise includes sidewall thermoplastic material. The container includes an internal chamber, the baffle and the sidewall. The sidewall forms an outer peripheral boundary of the internal chamber. The baffle is arranged within the internal chamber.

According to another aspect of the present disclosure, a method is provided for manufacturing a fuel reservoir. During this method, baffle thermoplastic material is stamp formed to form a baffle of the fuel reservoir. Fiber-reinforced thermoplastic material is wrapped around the baffle using an in-situ fiber placement device to form a sidewall of the fuel reservoir. The fiber-reinforced thermoplastic material includes fiber reinforcement within sidewall thermoplastic material. The sidewall thermoplastic material is heated as the fiber-reinforced thermoplastic material is being wrapped to bond the sidewall thermoplastic material to the baffle thermoplastic material.

According to still another aspect of the present disclosure, another method is provided for manufacturing a fuel reservoir. During this method, a baffle of the fuel reservoir is provided. The baffle is configured from or otherwise includes baffle thermoplastic material. A mandrel is provided. The baffle is arranged with and supported by the mandrel. Fiber-reinforced thermoplastic material is wrapped around the mandrel and the baffle using an in-situ fiber placement device to form a sidewall of the fuel reservoir. The fiber-reinforced thermoplastic material includes fiber reinforcement within sidewall thermoplastic material. The sidewall thermoplastic material is heated as the fiber-reinforced thermoplastic material is being wrapped to bond the sidewall thermoplastic material to the baffle thermoplastic material.

The additive manufacturing device may be configured as or otherwise include a laser assisted, in-situ fiber placement device.

The forming of the sidewall may include placing and heating fiber-reinforced thermoplastic material using the additive manufacturing device. The fiber-reinforced thermoplastic material may include fiber reinforcement embedded within the sidewall thermoplastic material.

The fiber-reinforced thermoplastic material may be heated using a laser.

The method may also include providing a mandrel. The baffle may be disposed with the mandrel prior to the forming of the sidewall. The mandrel may support the sidewall thermoplastic material during the forming of the sidewall.

The mandrel may locate the baffle during the forming of the sidewall.

The forming of the sidewall may include: wrapping fiber-reinforced thermoplastic material around the mandrel and the baffle, the fiber-reinforced thermoplastic material including fiber reinforcement embedded within the sidewall thermoplastic material; and heating the fiber-reinforced thermoplastic material to form the sidewall and bond the sidewall thermoplastic material to the baffle thermoplastic material.

The method may also include removing the mandrel from within an internal bore of the sidewall following the forming of the sidewall.

The removing of the mandrel may include mechanically collapsing the mandrel.

The removing of the mandrel may include decomposing the mandrel.

The container may also include an endwall connected to the sidewall. The mandrel may be removed through an aperture in the endwall.

The method may also include bonding an endwall to the sidewall following the removing of the mandrel. The container may also include the endwall.

The method may also include integrally forming an endwall with the sidewall using the additive manufacturing device. The container may include the endwall. The endwall may form a side peripheral boundary of the internal chamber.

The method may also include: providing an endwall; and bonding the endwall to the sidewall following the forming of the sidewall. The container may include the endwall. The endwall may form a side peripheral boundary of the internal chamber.

The providing of the endwall may include stamp forming the endwall.

The providing of the baffle may include stamp forming the baffle.

The container may be configured as a fuel reservoir for an aircraft.

The baffle may divide the internal chamber into a plurality of fluidly coupled sub-chambers. The baffle may have a percentage of open area across the internal chamber that is less than fifty percent.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 7 is a side sectional illustration of a portion of the container with the mandrel removed.

FIGS. 8A and 8B schematically illustrate an expandable/collapsible mandrel in expanded and collapsed arrangements.

FIG. 9 is a side sectional illustration of sidewalls for the container.

FIG. 10 is a side sectional illustration of one of the sidewalls configured with an aperture.

DETAILED DESCRIPTION

Figure 1:
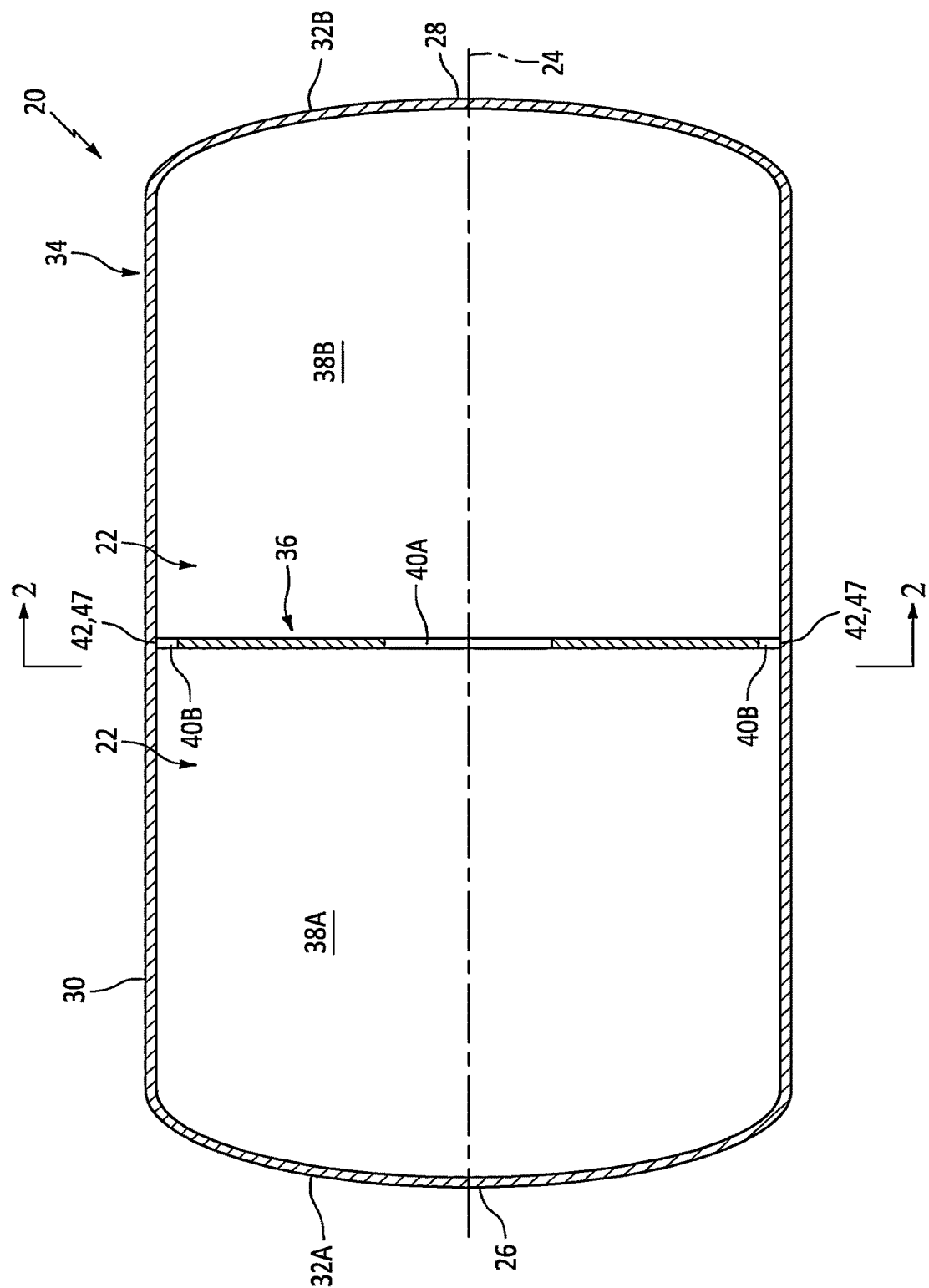
FIG. 1 is a side sectional illustration of a thermoplastic container with an internal baffle.
Figure 2:
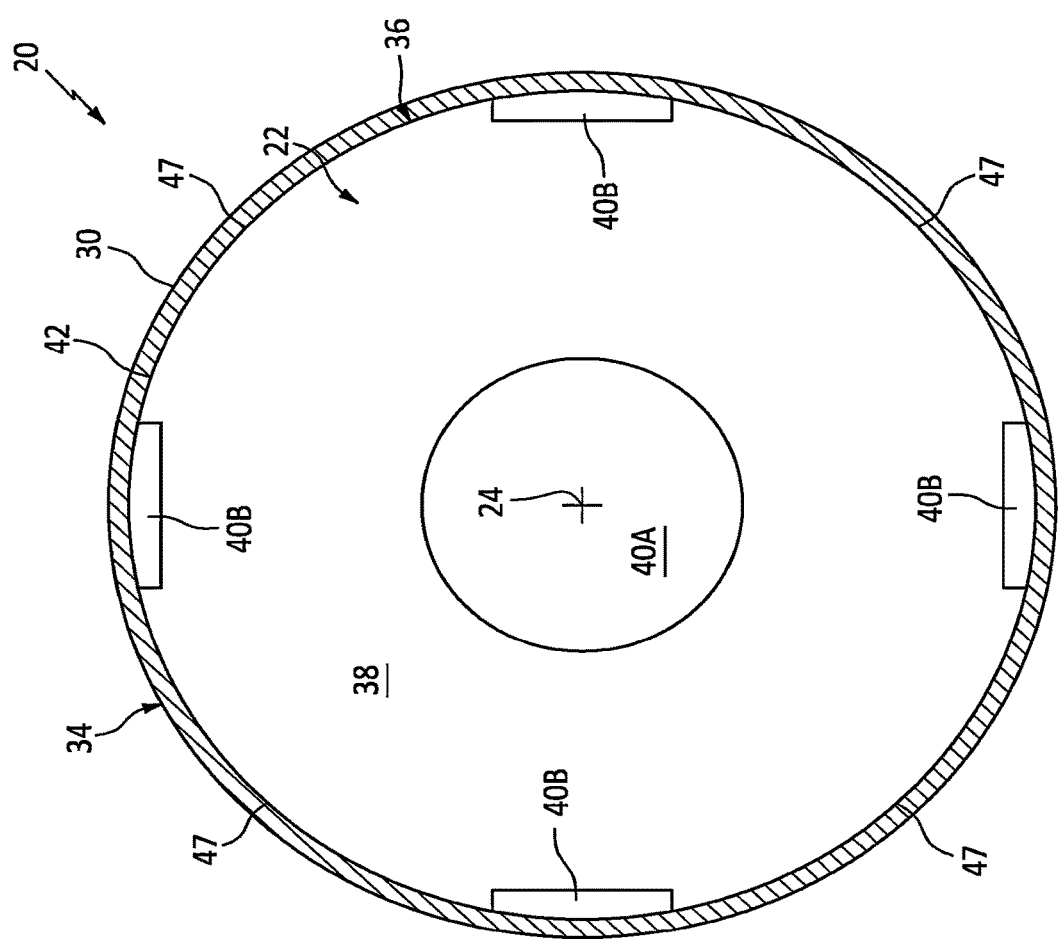
FIG. 2 is a cross-sectional illustration of the thermoplastic container taken along line 2-2 in FIG. 1.

FIGS. 1 and 2 illustrate a thermoplastic container 20 with an internal chamber 22 such as a sealed, fluid tight internal cavity. The container 20 may be a fuel reservoir for an apparatus such as an aircraft; e.g., an airplane, a helicopter or a drone. The container 20, for example, may be configured to store hydrocarbon fuel (e.g., jet fuel) or non-hydrocarbon fuel (e.g., liquid hydrogen) within its internal chamber 22 for subsequent use in a powerplant of the aircraft. Briefly, the aircraft powerplant may be configured as part of a propulsion system for the aircraft and/or an electrical power generation system for the aircraft. The container 20 of the present disclosure, however, is not limited to aircraft applications nor to storing fuel for a powerplant. The container 20, for example, may alternatively be configured for storing potable water, wastewater, lubricant, coolant and/or any other fluid in liquid and/or gaseous form. However, for case of description, the container 20 may be described below as the fuel reservoir for the aircraft powerplant.

The container 20 of FIG. 1 extends longitudinally along a longitudinal centerline 24 of the container 20 between a first end 26 of the container 20 and a second end 28 of the container 20. The container 20 includes a (e.g., cylindrical) container sidewall 30 and one or more (e.g., partially hemispherical) container endwalls 32A and 32B (generally referred to as "32"). The sidewall 30 extends longitudinally along the longitudinal centerline 24 between and to the first endwall 32A and the second endwall 32B. This sidewall 30 may be formed integral with the first endwall 32A and/or the second endwall 32B. Alternatively, the sidewall 30 may be formed discrete from and then subsequently connected (e.g., welded or otherwise bonded) to the first endwall 32A and/or the second endwall 32B. The first endwall 32A is located at (e.g., on, adjacent or proximate) the container first end 26. The second endwall 32B is located at the container second end 28.

The sidewall 30, the first endwall 32A and the second endwall 32B of FIGS. 1 and 2 may collectively form an exterior shell 34 (e.g., casing) of the container 20 that surrounds and forms boundaries of the internal chamber 22. The sidewall 30, for example, extends circumferentially about the longitudinal centerline 24 and the internal chamber 22 and forms a radial outer peripheral boundary of the internal chamber 22. The first endwall 32A encloses the container first end 26 and forms a longitudinal end peripheral boundary of the internal chamber 22 at the container first end 26. The second endwall 32B encloses the container second end 28 and forms a longitudinal end peripheral boundary of the internal chamber 22 at the container second end 28.

To reduce shifting, swashing and/or other (e.g., undesirable, unintended, etc.) movement of fluid (e.g., the fuel) within the internal chamber 22, the container 20 of FIGS. 1 and 2 includes at least (or only) one internal baffle 36. This baffle 36 is arranged within the internal chamber 22. The baffle 36 may divide the internal chamber 22 into a plurality of sub-chambers 38A and 38B (generally referred to as "38"); e.g., fluidly coupled sub-cavities, zones, etc. The baffle 36 of FIGS. 1 and 2, for example, extends laterally across the internal chamber 22 to opposing (e.g., diametric) sides of the exterior shell 34. More particularly, the baffle 36 may extend radially out (e.g., in all direction along a reference plane offset (e.g., perpendicular) to the longitudinal centerline 24) towards or to the sidewall 30. The baffle 36 is also welded or otherwise bonded to the exterior shell 34 and its sidewall 30.

The baffle 36 of FIGS. 1 and 2 includes one or more apertures 40A and 40B (generally referred to as "40"); e.g., windows, ports, through-holes, notches, grooves, etc. These apertures 40 fluidly couple the sub-chambers 38 together on opposing longitudinal sides of the baffle 36. The apertures 40 collectively provide the baffle 36 with a percentage of open area (POA) across the internal chamber 22. This percentage of open area may be less than fifty percent (50%); e.g., less than forty percent (40%), thirty percent (30%), twenty percent (20%), etc. Thus, while the apertures 40 in the baffle 36 fluidly couple the sub-chambers 38 together and may permit flow of the fluid across the baffle 36, material of the baffle 36 may reduce shifting, swashing and/or other (e.g., undesirable, unintended, etc.) movement of fluid within the internal chamber 22. The present disclosure, however, is not limited to the foregoing exemplary percentage of open area.

Referring to FIG. 2, at least one of the apertures (e.g., 40A) may be disposed in a central region of the baffle 36. In addition or alternatively, one or more of the apertures (e.g., 40B) may be disposed along an outer edge 42 of the baffle 36; e.g., between the baffle 36 and the sidewall 30. Of course, various baffle aperture arrangements are known in the art, and the present disclosure is not limited to any particular ones thereof.

Figure 3:
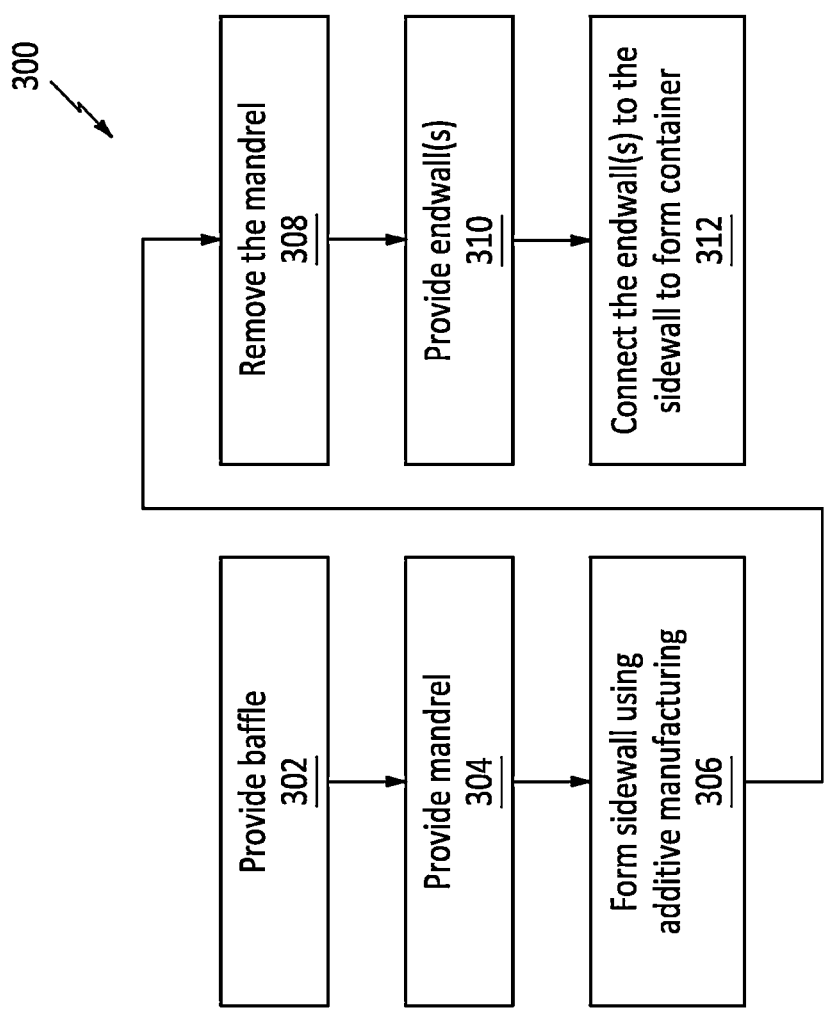
FIG. 3 is a flow diagram of a method for manufacturing a thermoplastic container.

FIG. 3 is a flow diagram of a method 300 for manufacturing a thermoplastic container. For ease of description, the manufacturing method 300 is described below with reference to the container 20 of FIGS. 1 and 2. The manufacturing method 300, however, may alternatively manufacture various other container types and configurations.

Figure 4:
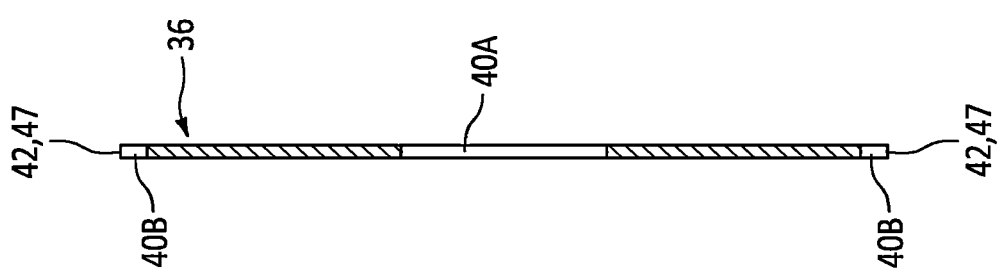
FIG. 4 is a side sectional illustration of the baffle.

In step 302, referring to FIG. 4, the baffle 36 is provided. Baffle thermoplastic material, for example, may be stamp formed to provide the baffle 36. The baffle thermoplastic material, more particularly, may be heated and pressed between a set of dies to form the baffle 36. Examples of the baffle thermoplastic material include, but are not limited to polyether ether ketone (PEEK), polyaryletherketone (PAEK), polyetherketoneketone (PEKK) and polyphenylene sulfide (PPS). The baffle 36 may be formed substantially (or only) from the baffle thermoplastic material. Alternatively, the baffle 36 may also be formed with fiber reinforcement embedded within the baffle thermoplastic material; here, the baffle thermoplastic material provides a matrix for the fiber reinforcement. Examples of the fiber reinforcement include, but are not limited to, fiberglass fibers, carbon fibers and/or aramid (e.g., Kevlar®) fibers.

Figure 5:
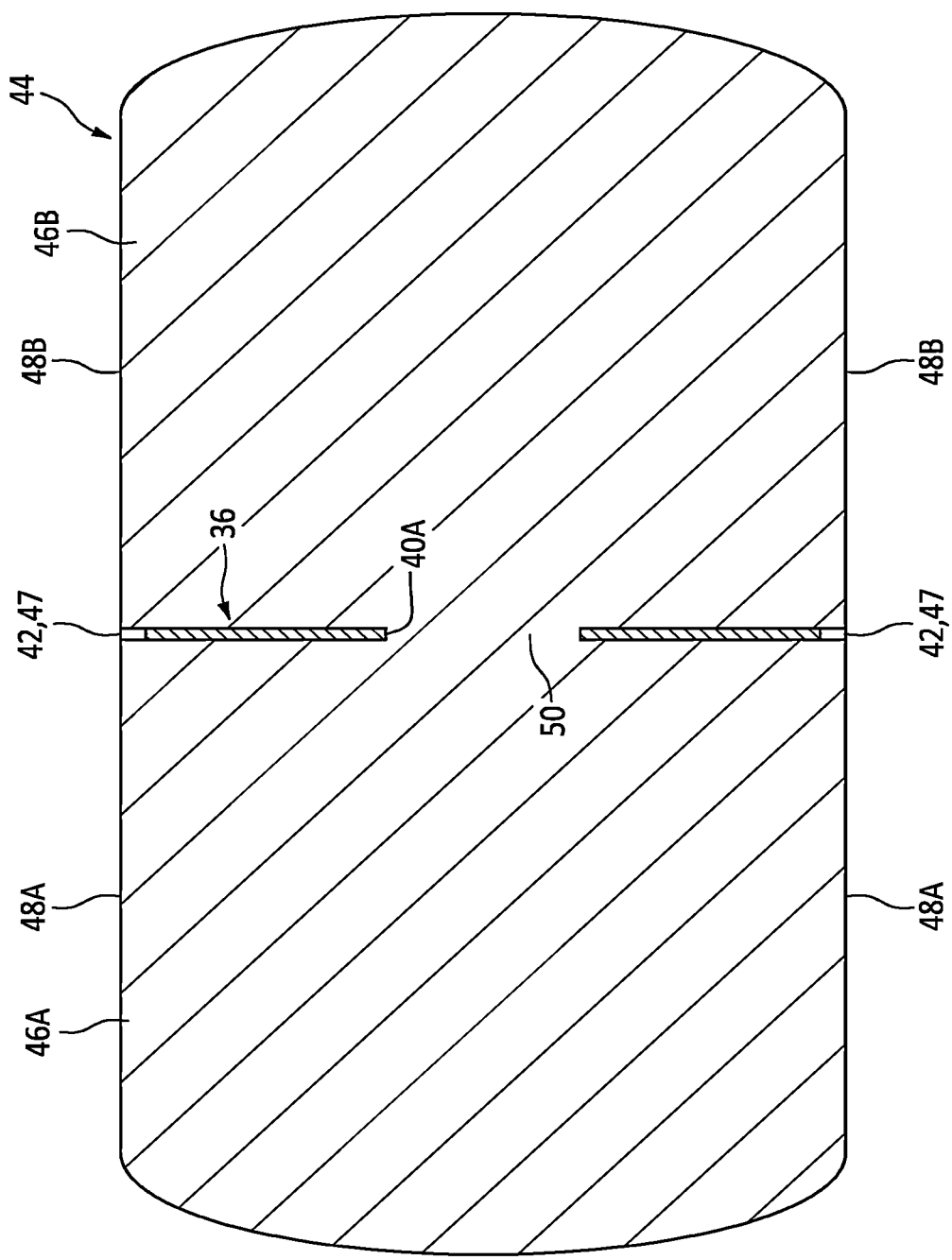
FIG. 5 is a side sectional illustration of the baffle arranged with a mandrel (schematically shown).

In step 304, referring to FIG. 5, a mandrel 44 is provided. The baffle 36 is disposed with the mandrel 44, and may be supported, located and/or orientated by the mandrel 44 during one or more subsequent step(s) of the manufacturing method 300. The baffle 36 of FIG. 5, for example, is arranged between two end sections 46A and 46B (generally referred to as "46") of the mandrel 44. A peripheral surface 47 (or surfaces) of the baffle 36 at the outer edge 42 may be radially aligned with (e.g., flush with), or may be slightly recessed in from or protrude out from, an adjacent exterior surface 48A, 48B of each mandrel end section 46A, 46B. An intermediate section 50 of the mandrel 44 may extend through at least one of the baffle apertures 40 (e.g., the central baffle aperture 40A) between and may connect the mandrel end sections 46.

Figure 6:
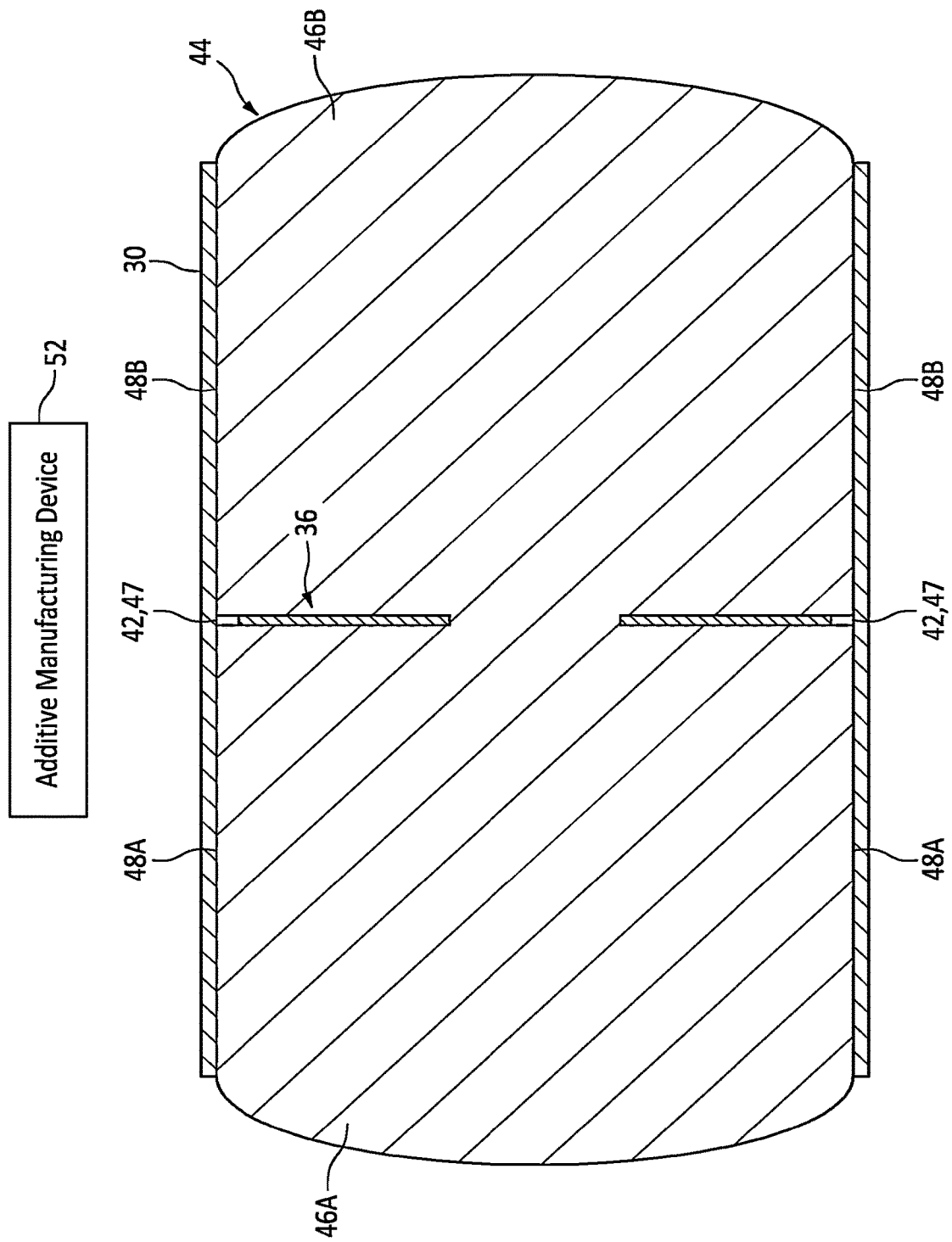
FIG. 6 is a side sectional illustration of a sidewall being formed on and around the baffle and the mandrel by an additive manufacturing device (schematically shown).

In step 306, referring to FIG. 6, the sidewall 30 is formed using an additive manufacturing device 52 such as a laser assisted, in-situ fiber placement device. Fiber-reinforced thermoplastic material (e.g., fiber-reinforced thermoplastic tape), for example, may be placed (e.g., deposited) with the mandrel 44 and the baffle 36 using the additive manufacturing device 52. More particularly, the fiber-reinforcement thermoplastic material may be wrapped around the mandrel end sections 46 as well as the baffle 36. During the placement, the fiber-reinforced thermoplastic material is (e.g., locally) heated using a laser or another heat source of the additive manufacturing device 52. This heating may facilitate (e.g., permanent) conformation of the fiber-reinforced thermoplastic material to the geometry of the mandrel end sections 46. The heating of the fiber-reinforced thermoplastic material may also bond (e.g., weld) the fiber-reinforced thermoplastic material being placed to (1) the baffle 36 upon placement of that fiber-reinforced thermoplastic material on the baffle 36 and (2) previously placed fiber-reinforced thermoplastic material upon placement thereon. The sidewall 30 may thereby be formed as a multi-layered structure that is bonded (e.g., welded) to the baffle 36 in a single formation step.

The fiber-reinforced thermoplastic material may include fiber reinforcement embedded within sidewall thermoplastic material. Examples of the fiber reinforcement include, but are not limited to, fiberglass fibers, carbon fibers and/or aramid (e.g., Kevlar®) fibers. Examples of the sidewall thermoplastic material include, but are not limited to, polyether ether ketone (PEEK), polyaryletherketone (PAEK), polyetherketoneketone (PEKK) and polyphenylene sulfide (PPS). This sidewall thermoplastic material may be the same as the baffle thermoplastic material. Alternatively, the sidewall 30 and the baffle 36 may be formed from different types of thermoplastic material—the sidewall thermoplastic material may different than the baffle thermoplastic material where, for example, the processes allow for melt temperature and adequate intermingling of polymer chains between the sidewall and baffle to be "welded". During the bonding (e.g., welding) of the fiber-reinforced thermoplastic material to the baffle 36, the sidewall thermoplastic material is bonded to the baffle thermoplastic material. During the bonding (e.g., welding) of the fiber-reinforced thermoplastic material to the previously placed fiber-reinforced thermoplastic material, a portion of the sidewall thermoplastic material is bonded to a portion of the sidewall thermoplastic material.

In step 308, referring to FIG. 7, the mandrel 44 is removed from an internal bore of the sidewall 30. During the removal, referring to FIGS. 8A and 8B, the mandrel 44 may be mechanically collapsed. Here, the mandrel 44 is configured as a mechanically expandable/collapsible mandrel. In another example, the mandrel 44 may be mechanically (e.g., via vibrations) and/or chemically decomposed. Here, the mandrel 44 is configured as an expendable mandrel, a washout mandrel, etc. The present disclosure, however, is not limited to the foregoing exemplary mandrel types or removal techniques.

In step 310, referring to FIG. 9, each endwall 32 is provided. Endwall thermoplastic material, for example, may be stamp formed to provide the respective endwall 32. The endwall thermoplastic material, more particularly, may be heated and pressed between a set of dies to form the respective endwall 32. Examples of the endwall thermoplastic material include, but are not limited to, polyether ether ketone (PEEK), polyaryletherketone (PAEK), polyetherketoneketone (PEKK) and polyphenylene sulfide (PPS). The respective endwall 32 may be formed substantially (or only) from the endwall thermoplastic material. Alternatively, the respective endwall 32 may also be formed with fiber reinforcement embedded within the endwall thermoplastic material; here, the endwall thermoplastic material provides a matrix for the fiber reinforcement. Examples of the fiber reinforcement include, but are not limited to, fiberglass fibers, carbon fibers and/or aramid (e.g., Kevlar®) fibers.

In step 312, referring to FIG. 1, each endwall 32 is connected to the sidewall 30 to form the container 20. Each endwall 32, for example, may be bonded to the sidewall 30 using the laser or another device part of or discrete from the additive manufacturing device 52.

In some embodiments, the manufacturing method 300 may be performed such that the mandrel 44 is removed prior to formation of the endwall(s) 32 and/or connection of the endwall(s) 32 to the sidewall 30. In other embodiments, the manufacturing method 300 may be performed such that the mandrel 44 is removed subsequent to the formation of the endwall(s) 32 and connection of the endwall(s) 32 to the sidewall 30. In such embodiments, the mandrel 44 and its respective mandrel end section(s) 46 may support the endwall(s) 32 during formation and/or connection of the endwall(s) 32 to the sidewall 30. This may also facilitate forming one or more of the endwalls 32 integrally with the sidewall 30. The fiber-reinforced thermoplastic material, for example, may be placed with the mandrel 44 and the baffle 36 using the additive manufacturing device 52 to form the sidewall 30 and the endwall(s) 32. Following the formation of the various container components, the mandrel 44 may be removed from an aperture 54 in at least one of the endwalls 32 (e.g., see FIG. 10) to provide an empty internal chamber 22.

Figure 11:
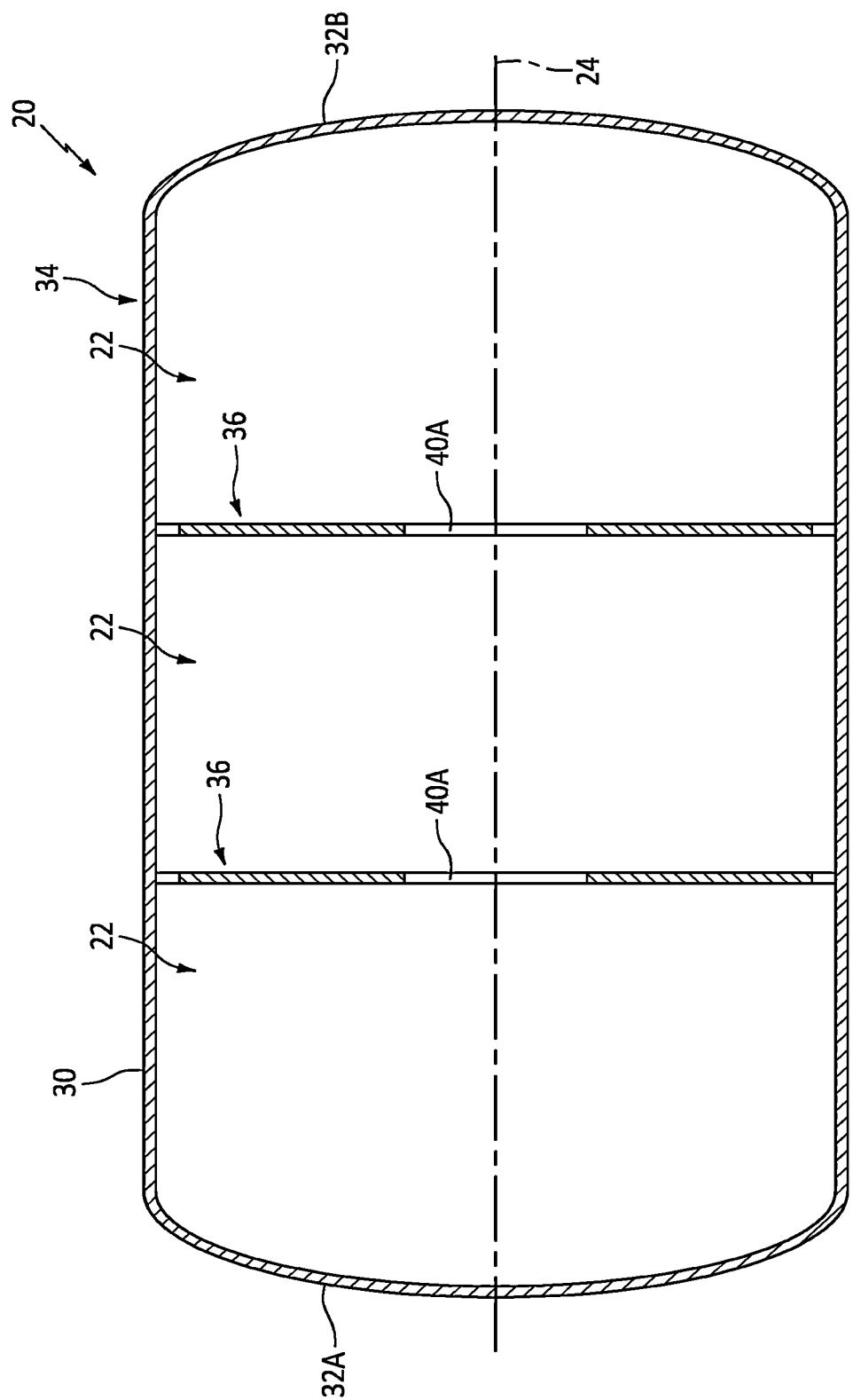
FIG. 11 is a side sectional illustration of the thermoplastic container with multiple internal baffles.

In some embodiments, referring to FIG. 1, the container 20 may include a single baffle 36 within the internal chamber 22. In other embodiments, referring to FIG. 11, the container 20 may include multiple of the baffles 36 within the internal chamber 22. Such a multi-baffle container 20 may be manufactured similarly using the manufacturing method 300.

Figure 12:
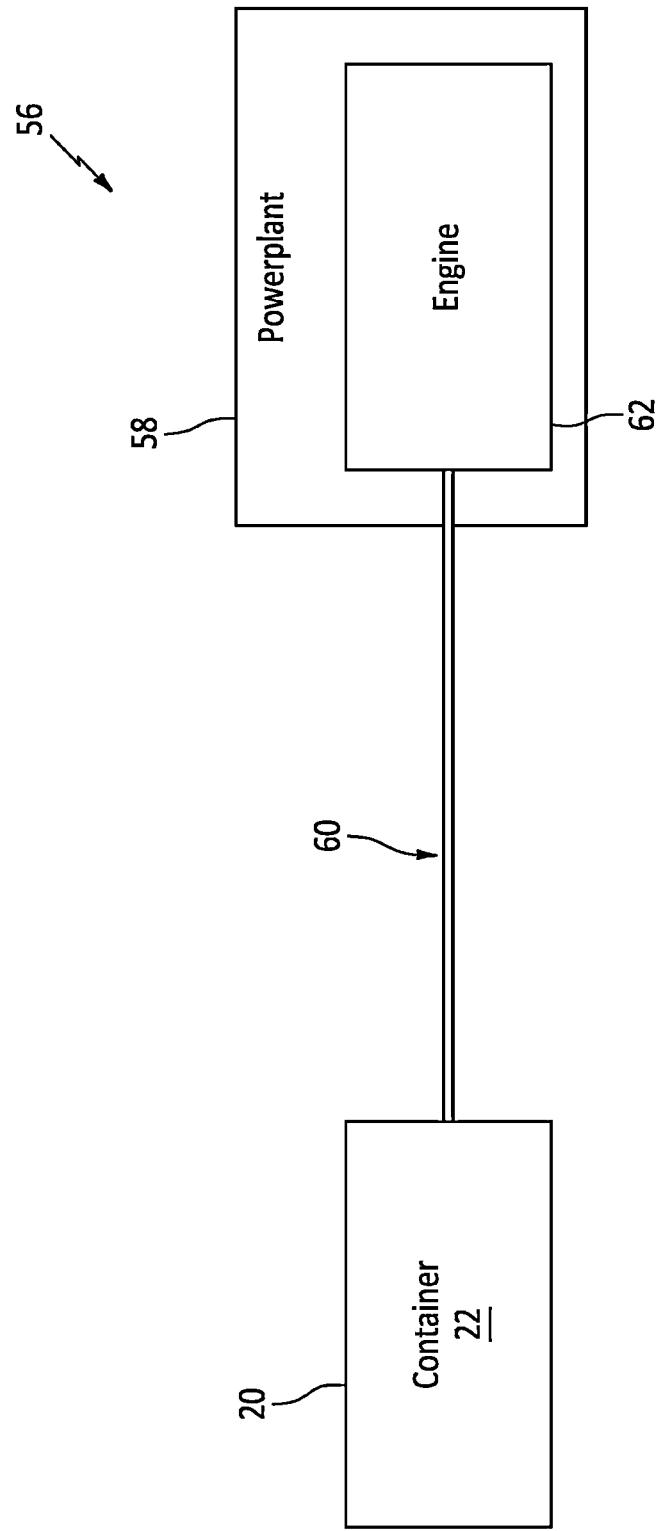
FIG. 12 is a schematic illustration of a fluid system for an aircraft.

FIG. 12 schematically illustrates a system 56 for an aircraft. This aircraft system 56 includes the container 20. The aircraft system 56 also includes an aircraft powerplant 58 and a fuel circuit 60 for delivering fuel stored within the internal chamber 22 of the container 20 to the aircraft powerplant 58. The aircraft powerplant 58 includes an engine 62. This engine 62 may be configured as or otherwise include a gas turbine engine or another type of engine such as, but not limited to, a reciprocating piston engine, a rotary engine, etc.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for manufacturing a container, comprising:
    disposing a stamp-formed baffle with a mandrel, the baffle comprising baffle thermoplastic material;
    forming a sidewall using an additive manufacturing device, the sidewall bonded to the baffle during the forming of the sidewall, the sidewall circumscribing the baffle and the mandrel, the sidewall comprising sidewall thermoplastic material, and the mandrel supporting the sidewall thermoplastic material during the forming of the sidewall; and
    removing the mandrel from within an internal bore of the sidewall following the forming of the sidewall;
    wherein the container includes an internal chamber, the baffle, and the sidewall, the sidewall forms an outer peripheral boundary of the internal chamber, and the baffle is arranged within the internal chamber.

2. The method of claim 1, wherein the additive manufacturing device comprises a laser assisted, in-situ fiber placement device.

3. The method of claim 1, wherein:
    the forming of the sidewall comprises placing and heating fiber-reinforced thermoplastic material using the additive manufacturing device; and
    the fiber-reinforced thermoplastic material comprises fiber reinforcement embedded within the sidewall thermoplastic material.

4. The method of claim 3, wherein the fiber-reinforced thermoplastic material is heated using a laser.

5. The method of claim 1, wherein the mandrel locates the baffle during the forming of the sidewall.

6. The method of claim 1, wherein the forming of the sidewall comprises:
    wrapping fiber-reinforced thermoplastic material around the mandrel and the baffle, the fiber-reinforced thermoplastic material comprising fiber reinforcement embedded within the sidewall thermoplastic material; and
    heating the fiber-reinforced thermoplastic material to form the sidewall and bond the sidewall thermoplastic material to the baffle thermoplastic material.

7. The method of claim 1, wherein the removing of the mandrel comprises mechanically collapsing the mandrel.

8. The method of claim 1, wherein the removing of the mandrel comprises decomposing the mandrel.

9. The method of claim 1, wherein:
    the container further includes an endwall connected to the sidewall; and
    the mandrel is removed through an aperture in the endwall.

10. The method of claim 1, further comprising:
    bonding an endwall to the sidewall prior to the removing of the mandrel;
    the container further including the endwall.

11. The method of claim 1, further comprising:
    integrally forming an endwall with the sidewall using the additive manufacturing device;
    the container further including the endwall, and the endwall forming a side peripheral boundary of the internal chamber.

12. The method of claim 1, further comprising:
    providing an endwall; and
    bonding the endwall to the sidewall following the forming of the sidewall;
    the container further including the endwall, and the endwall forming a side peripheral boundary of the internal chamber.

13. The method of claim 12, wherein the providing of the endwall comprises stamp forming the endwall.

14. The method of claim 1, wherein the providing of the baffle comprises stamp forming the baffle.

15. The method of claim 1, wherein the container is configured as a fuel reservoir for an aircraft.

16. The method of claim 1, wherein:
    the baffle divides the internal chamber into a plurality of fluidly coupled sub-chambers; and
    the baffle has a percentage of open area across the internal chamber that is less than fifty percent.

17. A method for manufacturing a fuel reservoir, comprising:
    stamp forming baffle thermoplastic material to form a baffle of the fuel reservoir;
    wrapping fiber-reinforced thermoplastic material around the baffle using an in-situ fiber placement device to form a sidewall of the fuel reservoir, the fiber-reinforced thermoplastic material comprising fiber reinforcement within sidewall thermoplastic material, and the baffle disposed with a mandrel during the forming of the sidewall;
    heating the sidewall thermoplastic material as the fiber-reinforced thermoplastic material is being wrapped to bond the sidewall thermoplastic material to the baffle thermoplastic material; and
    removing the mandrel from within an internal bore of the sidewall following the heating of the sidewall thermoplastic material.

18. A method for manufacturing a fuel reservoir, comprising:
    providing a stamp-formed baffle of the fuel reservoir, the baffle comprising baffle thermoplastic material;
    providing a mandrel, the baffle arranged with and supported by the mandrel;
    wrapping fiber-reinforced thermoplastic material around the mandrel and the baffle using an in-situ fiber placement device to form a sidewall of the fuel reservoir, the fiber-reinforced thermoplastic material comprising fiber reinforcement within sidewall thermoplastic material;
    heating the sidewall thermoplastic material as the fiber-reinforced thermoplastic material is being wrapped to bond the sidewall thermoplastic material to the baffle thermoplastic material; and removing the mandrel from within an internal bore of the sidewall following the heating of the sidewall thermoplastic material.

19. The method of claim 18, wherein:

the fuel reservoir further includes an endwall connected to the sidewall; and the mandrel is removed through an aperture in the endwall.

20. The method of claim 18, further comprising providing an endwall connected to the sidewall prior to the removing of the mandrel.

* * * * *